R. N. BERG.
LANDSCAPE GARDENER'S INSTRUMENT.
APPLICATION FILED APR. 6, 1918.
1,278,575.
Patented Sept. 10, 1918.
2 SHEETS—SHEET 2.
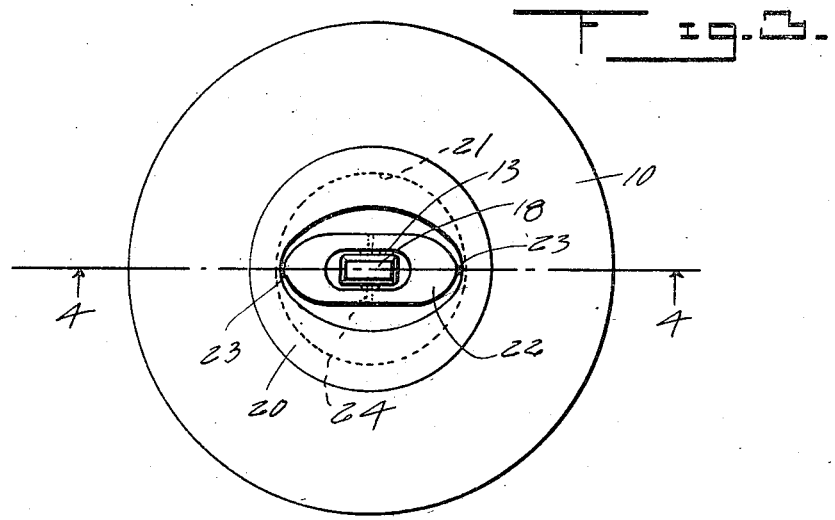
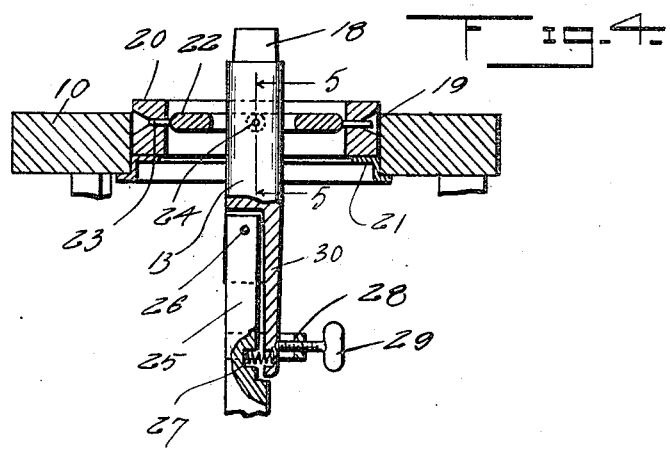
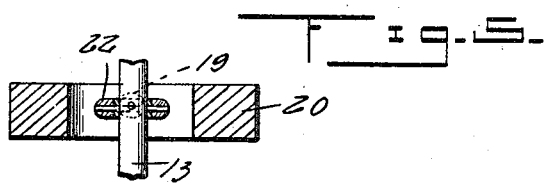
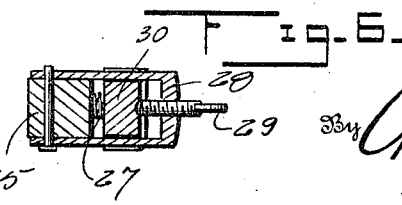
Inventor
R. N. Berg.

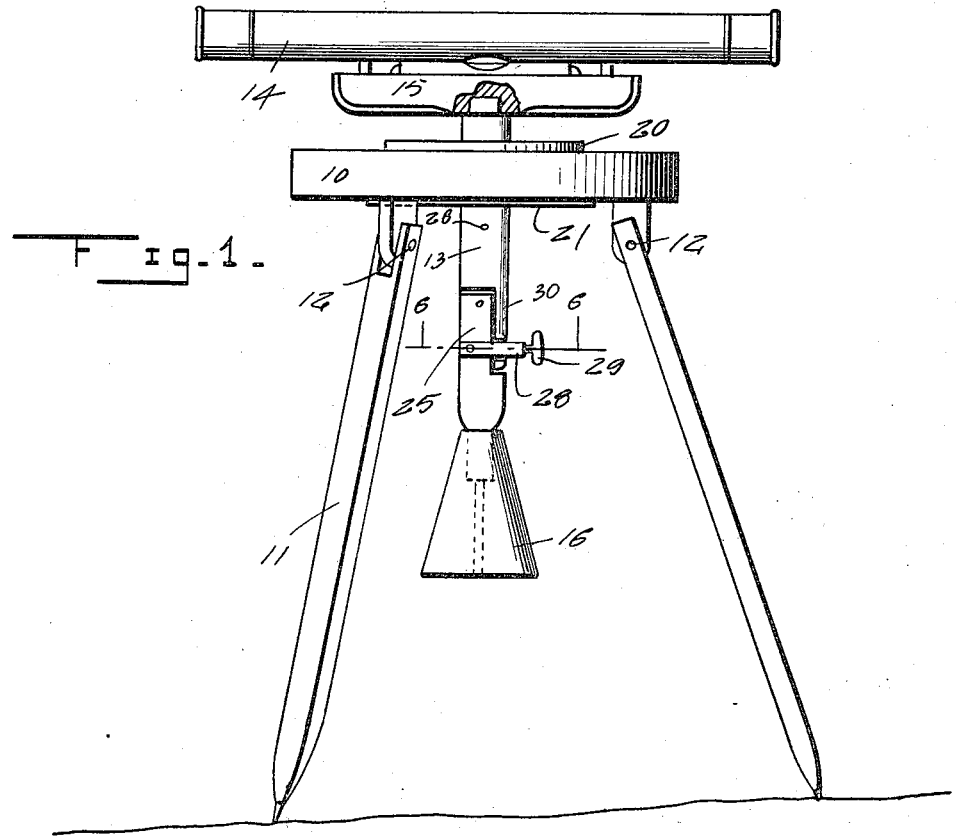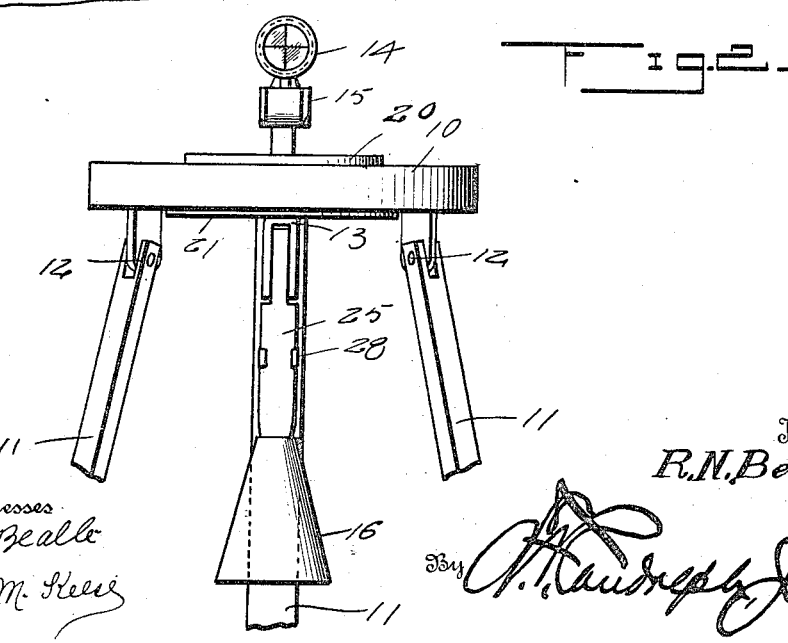

UNITED STATES PATENT OFFICE.

REUBEN N. BERG, OF TURLOCK, CALIFORNIA.

LANDSCAPE-GARDENER'S INSTRUMENT.

1,278,575.  Specification of Letters Patent.  Patented Sept. 10, 1918.

Application filed April 6, 1918. Serial No. 227,074.

*To all whom it may concern:*

Be it known that I, REUBEN N. BERG, a citizen of the United States, residing at Turlock, in the county of Stanislaus and State of California, have invented certain new and useful Improvements in Landscape-Gardeners' Instruments; and I do hereby declare the following to be a full, clear, and exact description of the invention, such as will enable others skilled in the art to which it appertains to make and use the same.

The object of the invention is to provide a simple and relatively inexpensive leveling and sighting instrument designed especially for the use of landscape gardeners and having all of the possibilities in the matter of use, so far as landscape gardening is concerned, of the far more expensive commercial transit employed by surveyors, the construction of the same being such that it will immediately level the sighting element or telescope when set up for position, whether the ground is level or not, and in connection with the foregoing to provide simple means whereby adjustment may be effected in the event of disarrangement of any of the parts.

Further objects and advantages will appear hereinafter, it being understood that changes in the form, proportion and details of the illustrated embodiment of the invention may be resorted to, within the scope of the appended claims, without departing from the spirit of the invention.

Figure 1 is a side view of an instrument constructed in accordance with the invention.

Fig. 2 is a similar view of a portion of the same viewed at an angle of ninety degrees from that shown in Fig. 1.

Fig. 3 is a plan view of the table, the telescope or sighting element being omitted.

Fig. 4 is a sectional view taken on the plane indicated by the line 4—4 of Fig. 3.

Fig. 5 is a detail section taken on the plane indicated by the line 5—5 of Fig. 4.

Fig. 6 is a detail sectional view taken on the plane indicated by the line 6—6 of Fig. 1.

The instrument consists essentially of a main or supporting table 10 having a plurality of preferably foldable supporting legs 11 hinged to the aforesaid table, as at 12, and a pendent staff 13 universally mounted for swinging movement in all directions upon the main or supporting table and designed to uphold in a level and operable position a telescope or sighting element 14. In the construction illustrated a spirit level attachment 15 is employed in connection with the telescope or sighting element, but is employed mainly as a check or supplemental means of determining whether or not the device is properly leveled, and as a means for verifying the adjustment of the weight 16 which is attached to and supported by the pendent staff as a means of bringing the latter to a perfectly vertical position when the instrument is set up ready for use.

The sighting element or telescope may have the spirit level attached permanently thereto as shown, the latter being removably mounted upon the upper end of the pendent staff, by providing said level with a socket 17 for engaging a reduced tongue 18 on said staff. Mounted on the main or supporting table 10, in a seat 19 formed therein, is a turntable 20 which revolubly rests upon a bed 21 carried by said main table and is adapted to be turned with the staff and telescope or sighting element, so that the operator may direct the latter to any desired point of the compass, and the staff is universally mounted in said turntable by means of a rocker 22, pivoted as at 23 upon the turntable and having the staff pivoted therein as at 24, the pivots 23 and 24 being arranged at right angles to each other, or in other words the axes of movements of said rocker and staff being at right angles to each other, so that under the influence of the weight, the staff is adapted to be accurately positioned vertically.

In order to provide for a truing of the instrument, which ordinarily is required but once, the weight is connected to the staff by means of a tongue 25 pivoted as at 26 to the body of the staff, and yieldingly held in position relative to the body of the staff by means of a spring 27 attached to the tongue 25 and extending around an adjacent portion of the staff is a yoke 28 in which is mounted a thumb screw 29 bearing against the extension 30 of said staff, and by the adjustment of the set screw in coöperation with the action of the said spring 27, a relative adjustment of the weight and staff, axially, may be secured, so that there is an accurate leveling of the sighting element or telescope when the tripod support is set up upon the ground, whether as above noted, the surface of the ground is level or not. As to whether or not the adjustment of the weight with reference to the body portion of the staff is accurate, may be determined or verified by means of the spirit level, and obviously after having secured a primary and accurate adjustment of the weight, further manipulation thereof is unnecessary in the use of the instrument, unless through jarring or rough usage, the adjustment should become disarranged.

It will be understood without specific illustration, which is deemed unnecessary, that any suitable housing may be employed as a wind guard around the pendulum leveling means.

It is obvious that the sighting element or telescope may be turned in any desired direction, the turntable permitting of such movement, while the universal mounting of the staff in the turntable will insure the proper leveling of said sighting element or telescope no matter what position the latter may take with reference to the main or supporting table.

What is claimed is:

1. An instrument of the class described having as elements a universally mounted pendulum and a sighting element or telescope carried thereby, said elements being relatively adjustable in the plane of the length of the sighting element to vary the center of gravity relative to the axis of support.

2. An instrument of the class described having a main table and supporting elements for the same, a turntable mounted in a depressed seat in the main table and adapted for revoluble adjustment relative thereto, a rocker mounted for pivotal movement in the turntable, a staff pivotally mounted for swinging movement upon the rocker, the axes of movements of said staff and rocker being at right angles to each other, and a sighting element or telescope supported by said staff.

3. An instrument of the class described having a supporting table, a turntable mounted thereon, a weighted staff mounted for universal swinging movement upon the turntable, a combined and relatively fixed sighting element or telescope and justifying element detachably mounted upon the upper extremity of said staff above the plane of the turntable, and means for varying the center of gravity of the staff relative to the sighting element.

4. An instrument of the class described having a universally mounted staff for carrying a sighting element or telescope and a weight adjustably connected with said staff, said weight being provided with a tongue having pivotal connection with the staff, a spring interposed between the adjacent portion of the tongue and staff, and a set screw carried by the tongue in engagement with the staff in opposition to said spring for varying the angular relation of the tongue and staff to secure an accurate gravital vertical positioning of the staff, the relative adjustment of said elements being in the plane of the length of said sighting element or telescope.

In testimony whereof I affix my signature in presence of two witnesses.

REUBEN N. BERG.

Witnesses:
W. E. SMITH,
DENNIS DWYER.

Copies of this patent may be obtained for five cents each, by addressing the "Commissioner of Patents, Washington, D. C."